(12) United States Patent
Campbell et al.

(10) Patent No.: US 11,246,430 B2
(45) Date of Patent: Feb. 15, 2022

(54) KINEMATIC MIRROR MOUNT AND ADJUSTMENT SYSTEM

(71) Applicant: Photon Valley, Inc., Lake Forest, CA (US)

(72) Inventors: James Campbell, Foothill Ranch, CA (US); Christopher Guerrero, Laguna Niguel, CA (US); Daniel Castro, Lake Forest, CA (US)

(73) Assignee: Photon Valley, Inc., Lake Forest, CA (US)

( * ) Notice: Subject to any disclaimer, the term of this patent is extended or adjusted under 35 U.S.C. 154(b) by 45 days.

(21) Appl. No.: 16/855,908

(22) Filed: Apr. 22, 2020

(65) Prior Publication Data

US 2021/0244203 A1 Aug. 12, 2021

Related U.S. Application Data

(63) Continuation-in-part of application No. 16/805,109, filed on Feb. 28, 2020, which is a continuation-in-part of application No. 16/786,936, filed on Feb. 10, 2020.

(51) Int. Cl.
*A47G 1/02* (2006.01)
*F16M 11/06* (2006.01)
(Continued)

(52) U.S. Cl.
CPC .............. *A47G 1/02* (2013.01); *F16M 11/06* (2013.01); *F16M 11/12* (2013.01); *G02B 7/198* (2013.01); *F16M 2200/021* (2013.01)

(58) Field of Classification Search
CPC .......... A47G 1/02; F16M 11/06; F16M 11/12; F16M 2200/021; G02B 7/198;
(Continued)

(56) References Cited

U.S. PATENT DOCUMENTS 1,112,935 A * 10/1914 Fe ..................... F16M 11/12
248/180.1
4,863,243 A 9/1989 Wakefield
(Continued)

FOREIGN PATENT DOCUMENTS

WO 2015088710 A1 6/2015
WO 2019164686 A1 8/2019

OTHER PUBLICATIONS

Edmund Optics; https://www.edmundoptios.com/c/optical-mirror-mounts/682/#; downloaded Feb. 10, 2020.
(Continued)

*Primary Examiner* — Christopher Garft
(74) *Attorney, Agent, or Firm* — Lynch LLP; Sean Lynch (57) ABSTRACT

Kinematic mounts are used frequently to hold objects such as mirrors, lenses, and other optical equipment. To adjust kinematic mounts, adjustment mechanisms are often required. Adjustment mechanisms can be used to make fine adjustments in applications where precision is required (e.g., laser system prototyping). Kinematic mounts that include never-before implemented form factors and structural elements require new adjustment solutions. This application describes systems that include both novel kinematic mounts as well as new adjustment mechanisms developed to reorient the new kinematic mounts. Adjustment mechanisms described in this application include a main body, a control frame, and control screws to adjust the orientation of the control frame. The control frame is coupled with a kinematic mount's housing, which rotates about a center of curvature of a bottom surface of the housing.

20 Claims, 8 Drawing Sheets

(51) Int. Cl.
*G02B 7/198* (2021.01)
*F16M 11/12* (2006.01)

(58) Field of Classification Search
CPC .......... G02B 7/004; G02B 7/02; G02B 7/023;
G02B 7/1824; G02B 7/1825; B60R 1/072
USPC .......................................... 359/871–874, 876
See application file for complete search history.

(56) References Cited

U.S. PATENT DOCUMENTS

| | | | |
|---|---|---|---|
| 5,737,132 A * | 4/1998 | Luecke ................ | G02B 7/1825 |
| | | | 359/819 |
| 6,053,469 A * | 4/2000 | Burgarella ............ | G02B 7/023 |
| | | | 248/476 |
| 6,411,447 B1 * | 6/2002 | Hilbert ................ | G02B 7/1825 |
| | | | 359/819 |
| 6,765,733 B1 | 7/2004 | Igl | |
| 7,421,918 B2 | 9/2008 | Cable | |
| 9,329,028 B2 | 5/2016 | Bridges | |
| 11,029,485 B2 * | 6/2021 | DeWitt, IV ........... | G02B 7/023 |
| 2008/0219756 A1 | 9/2008 | Grant | |
| 2013/0010381 A1 * | 1/2013 | Park ...................... | G02B 7/198 |
| | | | 359/872 |

OTHER PUBLICATIONS

Thorlabs; https://www.thorlabs.com/navigation.cfm?guide_id=71; downloaded Feb. 10, 2020.
Newport Corporation; https://www.newport.com/c/optical-mounts; downloaded Feb. 10, 2020.

\* cited by examiner

KINEMATIC MIRROR MOUNT AND ADJUSTMENT SYSTEM

This application is a continuation in part and claims priority to U.S. patent application Ser. No. 16/805,109 filed Feb. 28, 2020 and to U.S. patent application Ser. No. 16/786,936 filed Feb. 10, 2020.

FIELD OF THE INVENTION

The field of the invention is kinematic mounts with associated adjustment mechanisms.

BACKGROUND

The background description includes information that may be useful in understanding the present invention. It is not an admission that any of the information provided in this application is prior art or relevant to the presently claimed invention, or that any publication specifically or implicitly referenced is prior art.

In the space of kinematic mounts for, e.g., mirrors or other optics equipment, innovation has been slow or nonexistent for many years. Few have approached this field with novel new thoughts or ideas on how kinematic mounts and their associated position and orientation adjustment mechanisms can be reinvented. Though many have improved on the current state of adjustment mechanisms over the years, none have reimagined the kinematic mount that those adjustment mechanisms work with. There therefore remains a need to develop improved kinematic adjustment mechanisms that account for a completely different type of kinematic mount.

The world of kinematic mounts, especially in the context of optics and laser optics, has been relatively untouched by recent innovation. Existing products intended to, e.g., hold a mirror in place on a laser prototyping board all use the same general form factor: a mirror is held in place by a kinematic mount that has several screws, where each screw can be turned to effect a change in the orientation of the mirror in the kinematic mount.

Within the industry, such companies as Thorlabs, Edmond Optics, and Newport Corporation all produce this style of kinematic mount. None of these companies have considered improvements to this configuration that can be achieved through a complete rethinking of the state of the art.

Although those industry players represent what is currently on sale, patents can give us an idea of what has been contemplated even if the inventions in those patents have never been brought to market. In searching through related patents, it is clear there have been attempts to improve on the state of the art, though patents in this field similarly focus on mere incremental improvements, and thus fail to consider different form factors and mechanisms that can be combined to create a dramatically improved kinematic mount. For example, U.S. Pat. No. 4,863,243 is directed to what is best described as an overly complicated device that takes on the same appearance as all other kinematic mounts that currently exist. This reference fails to consider a spherical or semi-spherical mount having a new locking mechanism that prevents orientation interference during the locking process. U.S. Pat. No. 5,737,132 discloses a similarly out-of-date concept. It describes a kinematic mount with a status quo form factor and fails to consider a spherical or semi-spherical mount, lacking in also in any kind of innovative new locking mechanism. Finally, U.S. Pat. No. 7,421,918 contemplates yet another kinematic mount that fails to deviate from the status quo. Such incremental improvements necessarily fail to re-imagine kinematic mounts and thus fail to contemplate the benefits of innovation in this space.

Regarding adjustment mechanisms, U.S. Pat. No. 6,765,733 to Igl et al., for example, describes a laser mounting system that includes several ball and socket joints with an associated adjustment system. The physical structure of the device in the '733 Patent fails to consider a reimagined kinematic mount, and thus fails to solve problems associated with new types of kinematic mounts that operate on fundamentally different bases than the state of the art. U.S. Pat. No. 9,329,028 to Bridges et al. describes mirror mounting systems having spherical or semispherical mounts, but because this patent again fails to contemplate new kinematic mounts that do not share many—if any—overlapping features with kinematic mounts as they currently exist.

These and all other extrinsic materials discussed in this application are incorporated by reference in their entirety. Where a definition or use of a term in an incorporated reference is inconsistent or contrary to the definition of that term provided in this application, the definition of that term provided in this application applies and the definition of that term in the reference does not apply.

It has yet to be appreciated that kinematic mounts can be reimagined using completely different structural elements than the prior art contemplates. And with new types of kinematic mounts come new needs for adjustment mechanisms. Thus, there is still a need in the art for improved systems that include kinematic mounts with adjustment mechanisms.

SUMMARY OF THE INVENTION

The present invention provides apparatuses, systems, and directed to adjustment mechanisms for kinematic mounts. In one aspect of the inventive subject matter, a kinematic mount and associated adjustment mechanism are contemplated, the system comprising: a main body having a mounting frame; a control frame comprising at least one coupling extrusion; a first control screw that contacts a main body surface at an end of the first control screw; a second control screw oriented orthogonally to the first control screw and that contacts a mounting frame surface at an end of the second control screw; wherein the mounting frame surface is orthogonal to the main body surface; wherein the first control screw couples with the control frame by passing through a first screw harness that is coupled with the control frame; wherein the second control screw couples with the control frame by passing through a second screw harness that is also coupled with the control frame; a housing comprising a curved outer surface on at least a bottom portion of the housing, at least one coupling hole on a back side of the housing configured to mate with the at least one extrusion on the control frame, and a housing through hole; a footing comprising a cradle that is sized and dimensioned for the curved outer surface of the housing to rest within the cradle, wherein the footing is configured to mate with the main body of the mounting frame; a tightening mechanism disposed at least partially within the housing through hole, the tightening mechanism comprising a top portion, a bottom portion, a locking interface component, and a compression spring, and where the tightening mechanism is configured to hold the housing in place relative to the footing upon tightening the top portion to the bottom portion with the spring and the locking interface component disposed on the top portion such that the locking interface component contacts both the top portion and an interior surface of the housing to apply pressure on the interior surface toward the footing.

In some embodiments, the first and second screw harnesses include internal threading. The system can also include a first spring and a second spring, where the first spring pulls the control frame toward the main body and the second spring pulls the control frame toward a second spring mount that is affixed to the main body. In some embodiments, the main body comprises an elongated divot for the end of the first control screw to move within upon turning the second control screw, and wherein the mounting frame surface comprises an elongated divot for the end of the second control screw to move within upon turning the first control screw.

The first screw harness can be moveably coupled with the control frame, and in some embodiments, the locking interface component comprises a curved outer surface. The top portion can include a hollow tip with internal threading and the bottom portion comprises a threaded tip configured to screw into the hollow tip. In some embodiments, the top portion has a flared portion between a first end and a second end, the flared portion configured to apply force to the compression spring upon tightening the tightening mechanism. The compression spring can be configured such that an inner diameter of the spring is greater than the outer diameter of the hollow tip, and the spring can also be positioned between the flared portion and the locking interface component. In some embodiments, the locking interface component contacts at least one interior surface of the housing as well as the compression spring.

In another aspect of the inventive subject matter, a kinematic mount and associated adjustment mechanism system are contemplated to include: a main body; a control frame coupled with the main body and comprising at least one coupling extrusion; a housing comprising a curved outer surface on at least a bottom portion of the housing, at least one coupling hole on a back side of the housing configured to mate with the at least one extrusion on the control frame, and a housing through hole; a footing comprising a cradle that is sized and dimensioned for the curved outer surface of the housing to rest within the cradle, wherein the footing is configured to mate with the main body of the mounting frame; a tightening mechanism disposed at least partially within the housing through hole, the tightening mechanism comprising a top portion, a bottom portion, a locking interface component, and a compression spring, and where the tightening mechanism is configured to hold the housing in place relative to the footing upon tightening the top portion to the bottom portion with the spring and the locking interface component disposed on the top portion such that the locking interface component contacts both the top portion and an interior surface of the housing to apply pressure on the interior surface toward the footing.

In some embodiments, the system also includes a mounting frame on the main body; a first control screw that contacts a main body surface at an end of the first control screw; a second control screw oriented orthogonally to the first control screw and that contacts a mounting frame surface at an end of the second control screw; where the mounting frame surface is orthogonal to the main body surface; where the first control screw couples with the control frame by passing through a first screw harness that is coupled with the control frame; and where the second control screw couples with the control frame by passing through a second screw harness that is also coupled with the control frame. The first and second screw harnesses can include internal threading.

In some embodiments, the system additionally includes a first spring and a second spring, where the first spring pulls the control frame toward the main body and the second spring pulls the control frame toward a second spring mount that is affixed to the main body. The main body can also have an elongated divot for the end of the first control screw to move within upon turning the second control screw, and the mounting frame surface can have an elongated divot for the end of the second control screw to move within upon turning the first control screw.

In some embodiments, the first screw harness is moveably coupled with the control frame. The locking interface component can have a curved outer surface. The top portion can have a hollow tip with internal threading and the bottom portion can accordingly have a threaded tip configured to screw into the hollow tip. In some embodiments, the top portion comprises a flared portion between a first end and a second end, the flared portion configured to apply force to the compression spring upon tightening the tightening mechanism. In some embodiments, the locking interface component contacts at least one interior surface of the housing as well as the compression spring.

One should appreciate that the disclosed subject matter provides many advantageous technical effects including an entirely new adjustment mechanism that is designed to function with kinematic mounts that pivot about a center point.

Various objects, features, aspects, and advantages of the inventive subject matter will become more apparent from the following detailed description of preferred embodiments, along with the accompanying drawing figures in which like numerals represent like components.

DETAILED DESCRIPTION

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

Systems of the inventive subject matter include two separable devices: a kinematic mount and an adjustment mechanism to facilitate orienting the kinematic mount when the two are coupled together. Kinematic mounts of the inventive subject matter include an array of components working together to create a mount that can have its orientation easily manually adjusted (e.g., by hand or by adjustment mechanism) and subsequently tightened in place to prevent accidental readjustment. In some embodiments, kinematic mounts are used to hold mirrors (e.g., a kinematic mirror mount), though in some embodiments, these same mounts can be configured to accommodate lasers, light sources, any type of reflector, etc. Once the mount is adjusted, it can be tightened to prevent unwanted movements. Mounts of the inventive subject matter are designed such that tightening the mount does not cause any unwanted movement (e.g., unwanted reorientation) in the process of tightening. This application focuses on embodiments that hold mirrors, though embodiments holding other components (e.g., lasers, reflectors, light sources, lenses, etc.) do not deviate from the inventive subject matter. Kinematic mounts of the inventive subject matter are designed to couple with adjustment mechanisms of the inventive subject matter to facilitate fine control of the kinematic mount orientation.

Figures 1, 2:
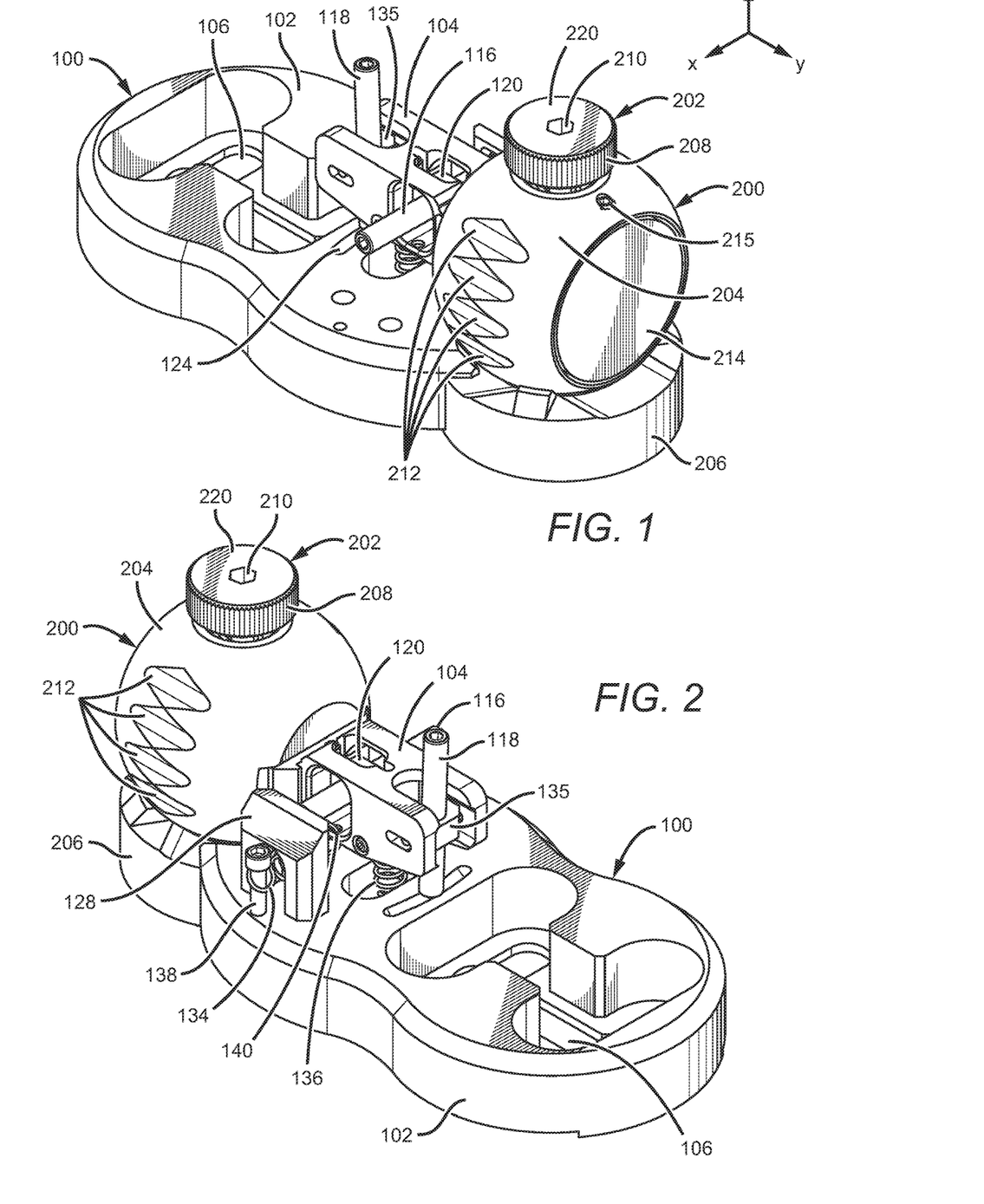
FIG. 1 is a perspective view of an adjustment mechanism with an attached kinematic mount.
FIG. 2 is a rear perspective view of an adjustment mechanism with an attached kinematic mount.

FIGS. 1 and 2 show perspective views of a kinematic mount 200 when it is coupled with an adjustment mechanism 100. The kinematic mirror mount 200 includes three main components: a tightening mechanism 202, a housing 204 and a footing 206. The tightening mechanism 202 is used to, upon turning, hold the housing 204 in a desired orientation. To facilitate hand tightening, the tightening mechanism 202 can include a textured surface 208 on a portion referred to as the tightening top 220 (e.g., ridges, a cross-hatched surface pattern, or some other textured feature such as rubber, plastic, or another high-friction material). These surface features make the tightening mechanism 202 easier to grip by hand. A slot 210, e.g., for a hex wrench, can be included on the top of the tightening mechanism 202 to facilitate tool tightening.

Housing 204 can be formed to have a mostly spherical shape. The mostly spherical shape allows the housing 204 to be rotated in any direction relative to the footing 206, which has a complementary concave shape (seen best in FIG. 9) to accommodate the housing 204. Housing 204 can include indentations 212 on its sides to make it easier for a user to grip its sides during manual reorientation. Indentations 212 can be included on both sides of the housing 204, and although indentations 212 are shown only on one side in the figures, similar indentations can appear on the opposite side without departing from the inventive subject matter. In some embodiments, only the bottom portion of the housing 204 is spherically shaped, allowing the rest of the housing (e.g., any portion of the housing that does not interact with the footing) to take on any form needed.

Figure 9:
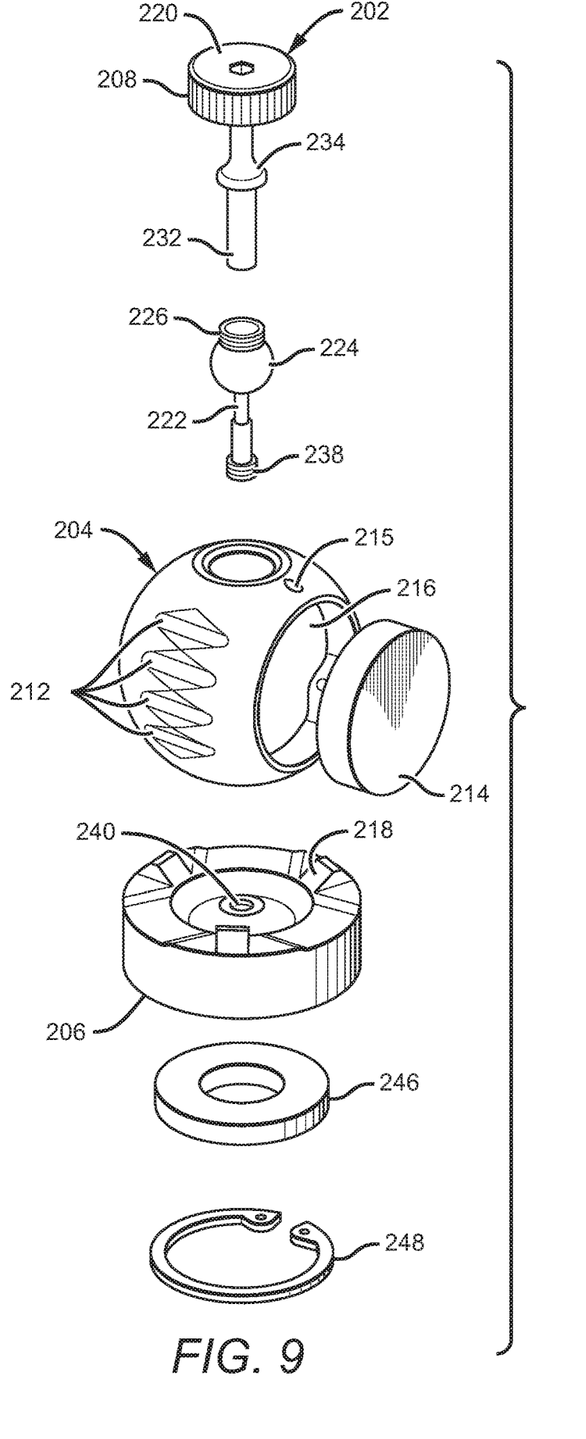
FIG. 9 is an exploded view of a kinematic mount.

Housing 204 is configured to hold, e.g., a mirror 214 or other reflective surface in a holding intrusion 216 (seen best in FIG. 9). Although this application describes a mirror, embodiments of the inventive subject matter can hold any type of object that fits into the intrusion 216 (e.g., a dichroic mirror, a laser, a lens, etc.). Mirror 214 can be held in place by set screw 215.

As mentioned above, housing 204 rests within a footing 206. Footing 206 has a flat bottom surface so that the footing 206 can rest on a flat surface such as a laser prototyping board or a table. The footing 206, as seen best in FIG. 9, has a top surface with a cradle 218 that is convex and complementary to the bottom of the housing 204. The cradle 218 shown in the figures is convex and spherical to allow the housing 204 to rotate about a center point (e.g., in embodiments where the portion of the housing that interacts with the footing that conforms to a spherical shape, it rotates about the center of curvature of the spherical portion of the housing). In some embodiments, the cradle 218 can comprise three or more contact points that the housing 202 can rest in, allowing the housing 202 to rotate relative to the cradle 218 without the footing including any curved surfaces at all. In some embodiments, the housing 204 can include different shapes other than spherical to facilitate more restricted movements. For example, the housing can have a cylindrical bottom that fits into a complementary cylindrical cradle, allowing the housing to rotate only about a single axis (e.g., a vertical axis).

Figure 4:
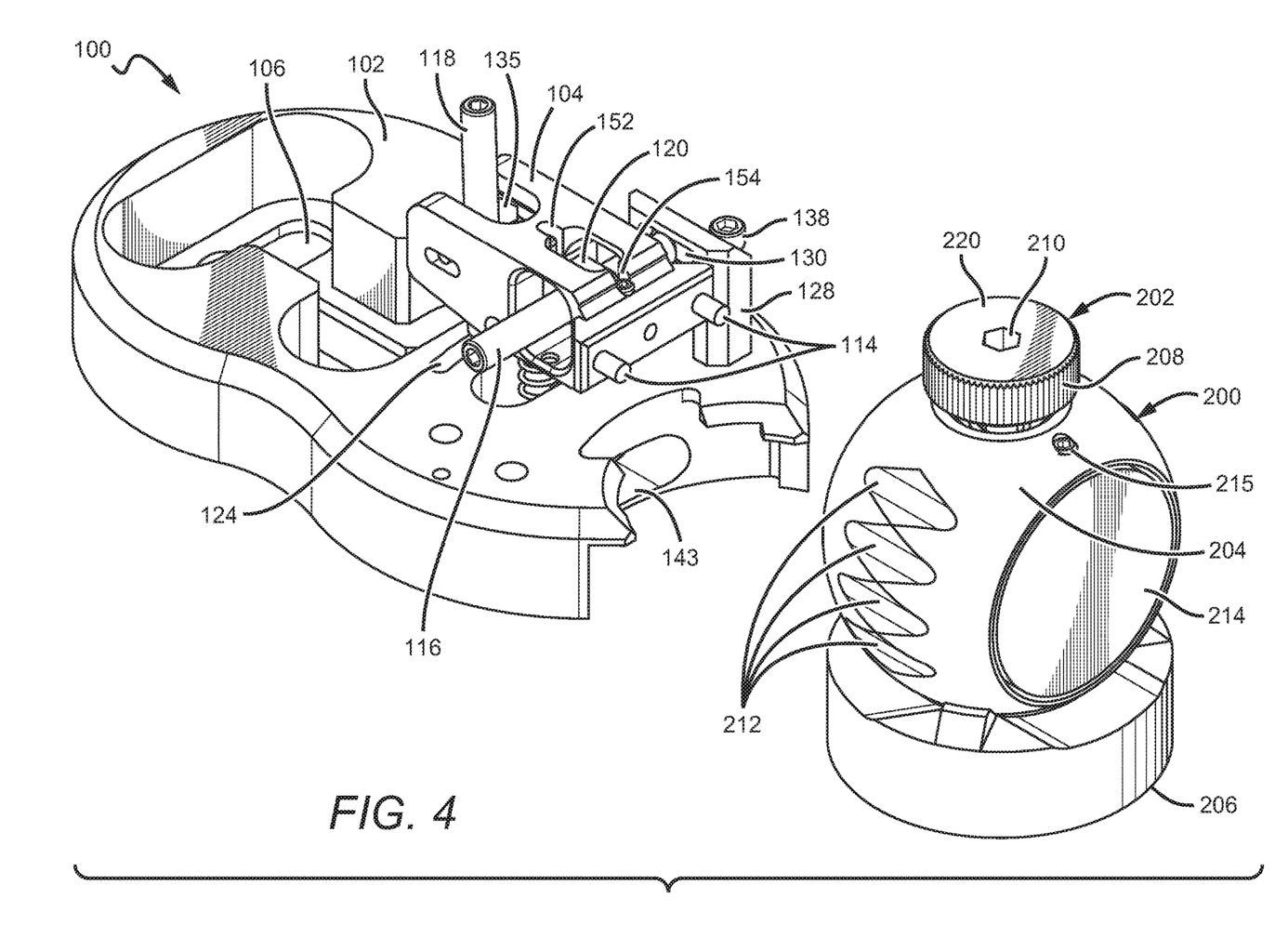
FIG. 4 is a perspective view of an adjustment mechanism with a detached kinematic mount.
Figure 5:
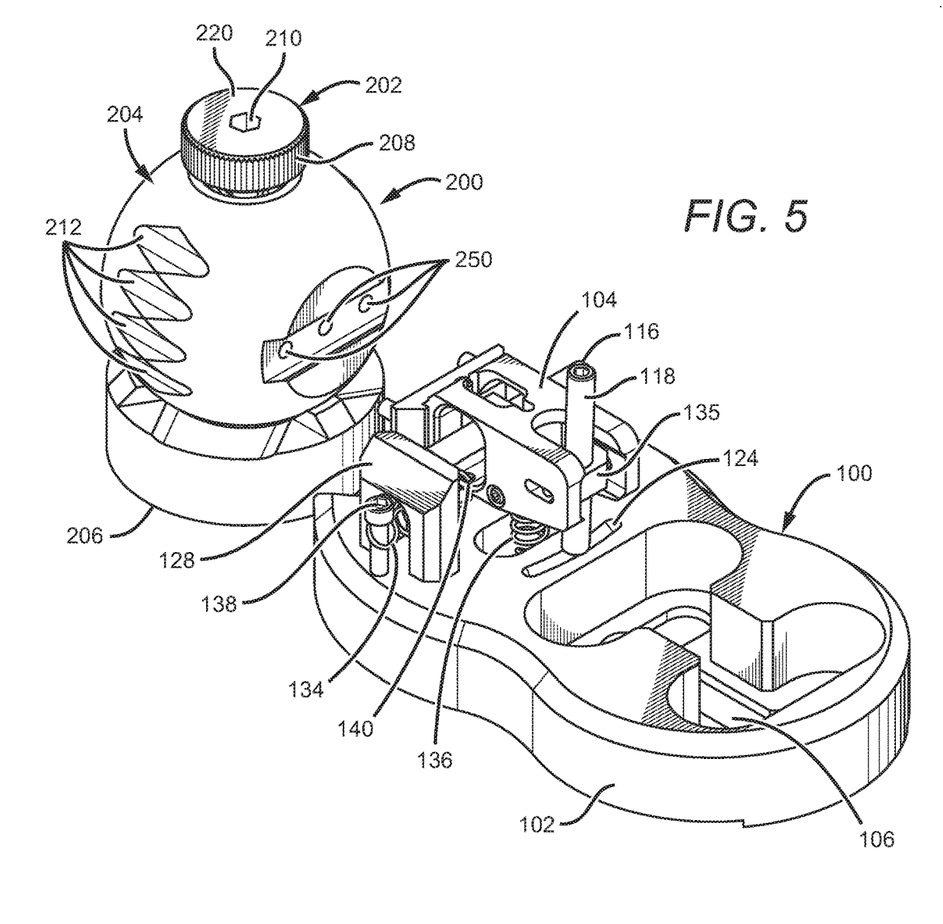
FIG. 5 is a rear perspective view of an adjustment mechanism with a detached kinematic mount.

Adjustment mechanisms of the inventive subject matter are designed to control orientation of kinematic mirror mounts when the two are coupled together. FIGS. 1 and 2 show a kinematic mount 200 coupled with an adjustment mechanism 100, and FIGS. 4 and 5 show the kinematic mount 200 decoupled from the adjustment mechanism 100.

Adjustment mechanism 100 includes a variety of different components, including a main body 102 and a control frame 104. The main body 102 acts as a foundational component that allows the adjustment mechanism 100 to be coupled with, e.g., a prototyping board or other surface. The main body 102 features a countersunk cutout 106 that allow for screws or other fasteners to hold the main body 102 to a surface. The cutout 106 shown in the figures is shaped like the capital letter I, though other configurations are also contemplated, including more than one cutout. The countersunk cutout 106 facilitates different orientations of the main body when it is fastened to a surface. It is countersunk so that the flared portion of, e.g., a machine screw can hold the main body down to a surface when the screw is screwed into that surface or coupled with a nut.

While the main body 102 need not take on any specific shape, the shape of the portion of the main body 102 that couples with the kinematic mount 200 should have a shape complementary to the shape of the kinematic mount's footing 206. FIGS. 4 and 5 show perspective views of the adjustment mechanism 100 and kinematic mount 200 when they are separated, showing off the complementary shapes between the two that facilitate coupling. As seen in FIG. 5, the kinematic mount 200 includes coupling holes 250. One or more of those coupling holes 250 are positioned on the housing 204 to facilitate mating with extrusions 114 disposed on the adjustment mechanism's control frame 104. Upon coupling the housing 204 with the control frame 104, causing the control frame 104 to move causes the housing 204 to move, facilitating moving the housing 204 into a desired orientation. In some embodiments, extrusions 114 can comprise magnets, coupling holes 250 can comprise magnets, or both can comprise magnets to improve a coupling connection.

Figure 10:
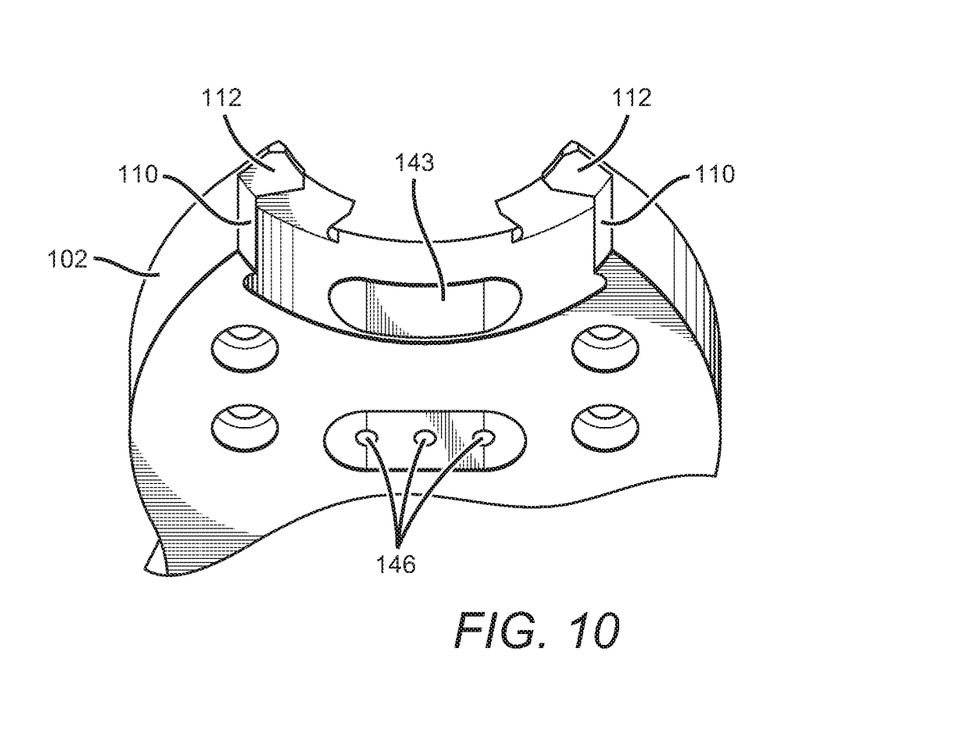
FIG. 10 shows a bottom view of a portion of a main body of an adjustment mechanism.

FIG. 10 shows a closer view of features of the mating portion of the main body 102. Main body 102 includes several features that contact the footing 206 of the kinematic mount 200. The mating portion includes two contact points 110 as well as two mating tabs 112. The two contact points 110 are formed with angled surfaces (e.g., curved) to match the curved surface of the footing 206. As shown in FIG. 10, contact points 110 are curved surfaces having a center of curvature that coincides with the center of curvature of the portions of the footing 206 that they contact while the adjustment mechanism 100 is coupled with the kinematic mount 200. In some embodiments, contact points 110 are flat surfaces angled to mate with the footing 206 despite not having a curvature matching that of the footing's. Contact points 110 are shown protruding from the surrounding material. This can help to hold the footing 206 stationary relative to the main body 102 by having the contact points fit into complementary slots, notches, or grooves on the footing. Mating tabs 112 are protrusions designed to help prevent the footing 206 from rotating relative to the main body 100 by their interactions with the footing 206 (e.g., friction interactions or by fitting into grooves on the footing). Holding the footing 206 stationary relative to the main body 102 ensures that the kinematic mount 200 can have its orientation adjusted accurately by the adjustment mechanism 100 without unwanted movements of the footing 206 relative to the main body 102.

Coupled with the main body 102 of the adjustment mechanism 100 is the control frame 104. The control frame can be seen in FIGS. 1-7 and 11-13, but is seen best in FIG. 11, which shows a close view of the control frame 104. As mentioned above, the control frame 104 couples with the kinematic mount's housing 204 via extrusions 114 which mate with coupling holes 250. Upon coupling the control frame 104 to the housing 204, the housing 204 and the control frame 104 move with one another such that causing the control frame 104 to move accordingly causes the housing 204 to move. This forms the basis of the adjustment mechanism's function, which is to facilitate orientation of the housing (e.g., fine adjustment by turning controls screws 118 and 116). The control frame 104 additionally features two control screws 116 & 118 that can be turned to change the position and orientation of the control frame 104, thereby also changing the position and orientation of the housing 204. Extrusions 114 can be machined from the same stock used to create the control frame 104, and, in some embodiments, extrusions 114 can alternatively be made from dowel pins or they can be screwed into the control frame 104.

The control frame 104 features at least a first control screw 116 and a second control screw 118. Each of the control screws 116 & 118 can feature a hex head as shown in the figures or e.g., any other type of screw head to facilitate tool-assisted turning of the screws. In some embodiments, control screws 116 & 118 can be hand-turned and feature, e.g., a textured surface to improve grip. Turning the first control screw 116 causes rotation of the housing 204 about the housing's z-axis as defined in FIG. 1. Notably, the reference frame associated with the housing (the x, y, and z-axes shown in FIG. 1) reorients with the housing 204. Thus, while the housing 204 is level relative to the main body (e.g., the mirror mounted within the housing faces straight ahead, as shown in FIG. 1), as the first control screw 116 is turned, the housing 204 rotates about only the z-axis with the other axes rotating with the housing 204 (e.g., such that they-axis always faces in the direction the housing is facing). This rotation is demonstrated in FIG. 12 by a double-sided curved arrow 122 showing how the control frame rotates and, in turn, causes the housing 204 to turn. The configuration of the control frame 104 and its associated control screws 116 & 118 give rise to rotation about at least the x-axis and the z-axis (which are defined according to the position and orientation of the housing 204) making it possible to, e.g., reflect light shining onto the mirror mounted in the housing 204 in any direction by using the control screws 116 & 118 to adjust the housing's orientation. The configuration of the control frame and its control screws can give rise to, e.g., small amounts of rotation about they-axis when control screw 118 is turned.

Figure 3:
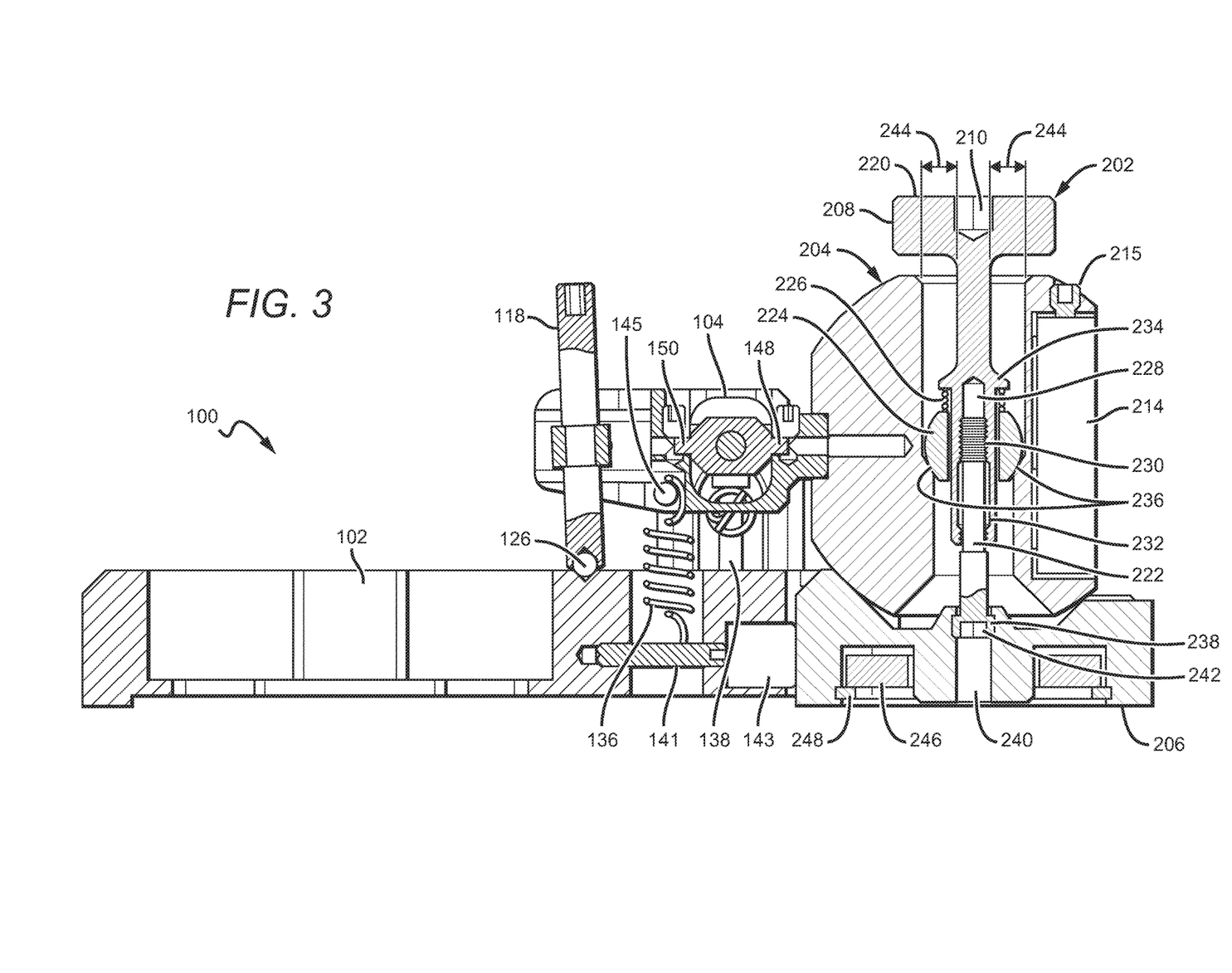
FIG. 3 cutaway side view of an adjustment mechanism with an attached kinematic mount.
Figure 8:
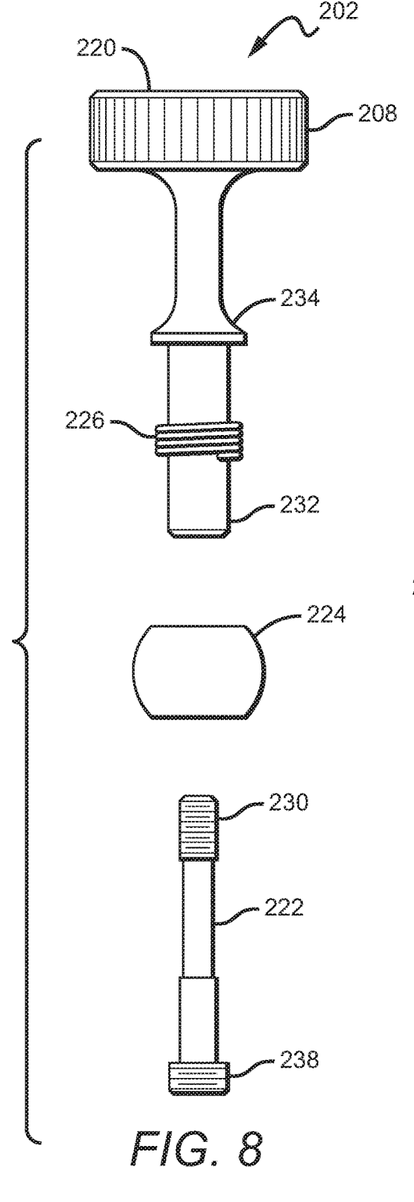
FIG. 8 is an exploded view of a kinematic mount's tightening mechanism.

FIG. 3 shows a cutaway view of the system, showing off the internal components of both the adjustment mechanism 100 and the kinematic mount 200. For the kinematic mount 200, the cutaway view shows the internal components that facilitate locking the housing 204 in place relative to the footing 206. This view also shows all the components of the tightening mechanism 202. The tightening mechanism 202 includes a tightening top 220, an anchor 222, a locking interface component 224, and a spring 226. The tightening mechanism 202 is also shown in FIG. 8.

As shown in FIG. 3, internal components of the kinematic mount 200 work together to hold the housing 204 stationary relative to the footing 206. To hold the housing 204 in place relative to the footing 206, a user turns the tightening top 220 (e.g., clockwise, or counterclockwise, depending on the threading) by gripping the tightening top 220 and turning. The tightening top 220 includes a hollow portion 228 therein that has interior threading that interacts with exterior threading 230 on the anchor 222 that is sized and dimensioned to fit within the tightening top 220.

In some embodiments, anchor 222 includes exterior threading 230 on only a portion of its length. This design is intended to make it more difficult to accidentally disassemble the kinematic mirror holder 200. In such embodiments, the tip 232 of the tightening top 220 includes internal threads identical to the internal threads that mate with the exterior threading 230 of the anchor 222. Thus, when assembling some embodiments of the kinematic mount 200, the interior threaded portion at the tip 232 of the tightening top 220 first screws down past the exterior threads 230 of the anchor 222. There is then a space separating the threads in the tip 232 from the interior threads shown mated with the exterior threads 230 of the anchor 222. If a user were to accidentally unscrew the tightening top 220 too far, the threaded tip of the anchor 202 would rest in the gap between interior threads in the tightening top 220, thus reducing risk of accidental disassembly by a user attempting to loosening the tightening mechanism.

To hold the housing 204 in place relative to the footing 206, the tightening mechanism 202 includes a locking interface component 224. The locking interface component 224 can be spherical, semi-spherical, or otherwise have a sloped surface that interacts with a sloped surface inside the housing that allows the housing to be rotated while resting within the footing 206. As shown in FIGS. 3, 8, and 9, the locking interface component 224 is mostly spherical, with a hole through it that the tightening top 220 can pass through. Above the locking interface component 224 is a compression spring 226 that contacts both a flanged portion 234 of the tightening top 220 as well as the locking interface component 224. As the tightening top 220 is turned, the flange 234 applies pressure to the spring 226, in turn compressing the spring 226, and the spring 226 thus applies increasing force against the locking interface component 224. The locking interface component 224 is thus pressed against the sloped surfaces 236 inside the housing 204, as shown in FIG. 3. The sloped surfaces 236 can be formed as a continuous surface that creates a sloped ring, or, in some embodiments, the sloped surfaces can be discontinuous, e.g., segmented.

As the tightening top 220 is turned, pressure builds between the locking interface mechanism 224 and the sloped surfaces 236, which in turn presses the housing 204 down into the footing 206. Eventually, as the tightening mechanism 202 is tightened down, friction forces between the locking interface component 224 and the sloped surfaces 236 within the housing 204, as well as friction forces between the housing 204 and the footing 202, become high enough that accidental movement of the housing 204 relative to the footing 206 becomes unlikely to occur, resulting in the housing 204 being held (or "locked") into place relative to the footing 206.

In some embodiments, the locking interface component 224 is made from a plastic, but it can alternatively be made from one or any combination of, e.g., a metal (e.g., stainless steel), an alloy, a composite, a rubber, etc. In some embodiments, the locking interface component 224 can be made from one material and have a coating of another material. For example, it can be made from a metal and include a rubber or rubber-like coating, or it can be made from a metal and have a different metal deposited on its surface. These different variations can affect the coefficient of friction between a locking interface component and the sloped surface(s) within a housing.

The tightening mechanism 202 is designed such that turning the tightening top 220 to lock the housing 204 in place relative to the footing 206 has no (or very little) effect on the housing's orientation relative to the footing 206. For example, if a laser is pointed at mirror 214 and that laser is reflected onto a distant surface, the housing's orientation can be adjusted (e.g., by hand or by an adjustment mechanism) to change where the laser is pointed upon reflection. When the housing 204 oriented such that a laser reflected to a desired location, the kinematic mirror mount 200 can be tightened and held in place by rotating the tightening top 220. Due to the design disclosed in this application, rotating the tightening top 220 does not discernably change the position of the laser light at its reflected destination. This represents a huge improvement over the prior art by facilitating quick and easy adjustment without concern for how tightening the mount might affect the orientation of the housing and, in turn, of the mirror held in the mount.

The anchor 222 of the tightening mechanism 202 comes up through an anchor opening 240 (seen best in FIGS. 9 and 13) in the footing 206. Because the anchor 222 has a flared base 238, it cannot pass all the way through the anchor opening 240 in the footing 206, and the flared base 238 creates the anchor 222 that the tightening top 220 pulls against to lock the housing 204 in position relative to the footing 206. The anchor 222 can include, e.g., an intrusion 242 to accommodate a hex key (as seen in FIG. 3). In some embodiments, anchor opening 240 includes internal threading, and flared base 238 includes external threading. To prevent the anchor 222 from being screwed straight through the anchor opening 240, anchor opening 240 includes a lip at the top that is narrower than the anchor 238. In some embodiments, the anchor opening 240 can be configured as a locknut or it can incorporate a locknut therein to help prevent the flared base of the anchor 222 from coming loose. In embodiments where the tightening mechanism 202 pulls against the anchor 222, the system behaves like an elongated jam nut upon tightening.

Prior to locking the housing 204 in place relative to the footing 206, the housing 204, as mentioned above, can have its orientation adjusted. The housing 204 can be freely rotated within the footing 206 when the tightening mechanism 202. Rotation of the housing 204 occurs about the center of curvature of the portion of the housing 204 that interacts with the footing 206. This center of curvature, in some embodiments, coincides with the position of the locking interface component 224 when the kinematic mount is fully assembled. In embodiments like the one shown in the Figures where the housing 204 is mostly spherical and the locking interface component 224 is also mostly spherical, by positioning the locking interface component 224 within the housing 204 such that it rests at the previously-described center of curvature with the locking interface component's also resting at that center of curvature, the housing 204 rotates (e.g., can be manually reoriented) in any way about that point.

The diameter of the shaft creating a through-hole in the housing 204 is wider at the top than at the bottom, as seen best in FIG. 3. There are a variety of reasons for this, several of which are described in this application, though this is not an exhaustive list. First, a wider top portion enables easy assembly by allowing the locking interface mechanism 224 to slide into position from the top of the housing 204 without requiring any assembly or disassembly of the housing itself. Second, having a wider top portion joined with a narrower bottom portion creates a transition having sloped surfaces 236 that interact with the locking interface component 224 to allow for both rotational movement as well as facilitating the locking behavior that arises by tightening the tightening mechanism 202. Third, having a wider upper portion allows for greater rotational freedom. For example, gaps 244 constrain how much the housing 204 can rotate until the walls of the internal shaft run into the top portion of the tightening mechanism 202. The same is true at the bottom of the housing 204, where the same interaction can occur, preventing rotation past a certain point. In some embodiments, the transition from the wider top to the narrower bottom can be linear, creating a conical shaft.

In some embodiments, the housing 204 may not be spherical about the entirety of its outer surface, but to facilitate the types of rotational repositioning (e.g., any rotation about a center of curvature in any direction) that are possible with the embodiment shown in the Figures, at a minimum the bottom surface of the housing 204 can be spherical where it contacts the footing 206 with the locking interface component 224 located at the center of curvature for spherical portions of the bottom surface of the housing that interact with the footing. As mentioned above, different housing bottom shapes can bring about different types of movements or restrict rotations to certain axes, etc.

Figure 13:
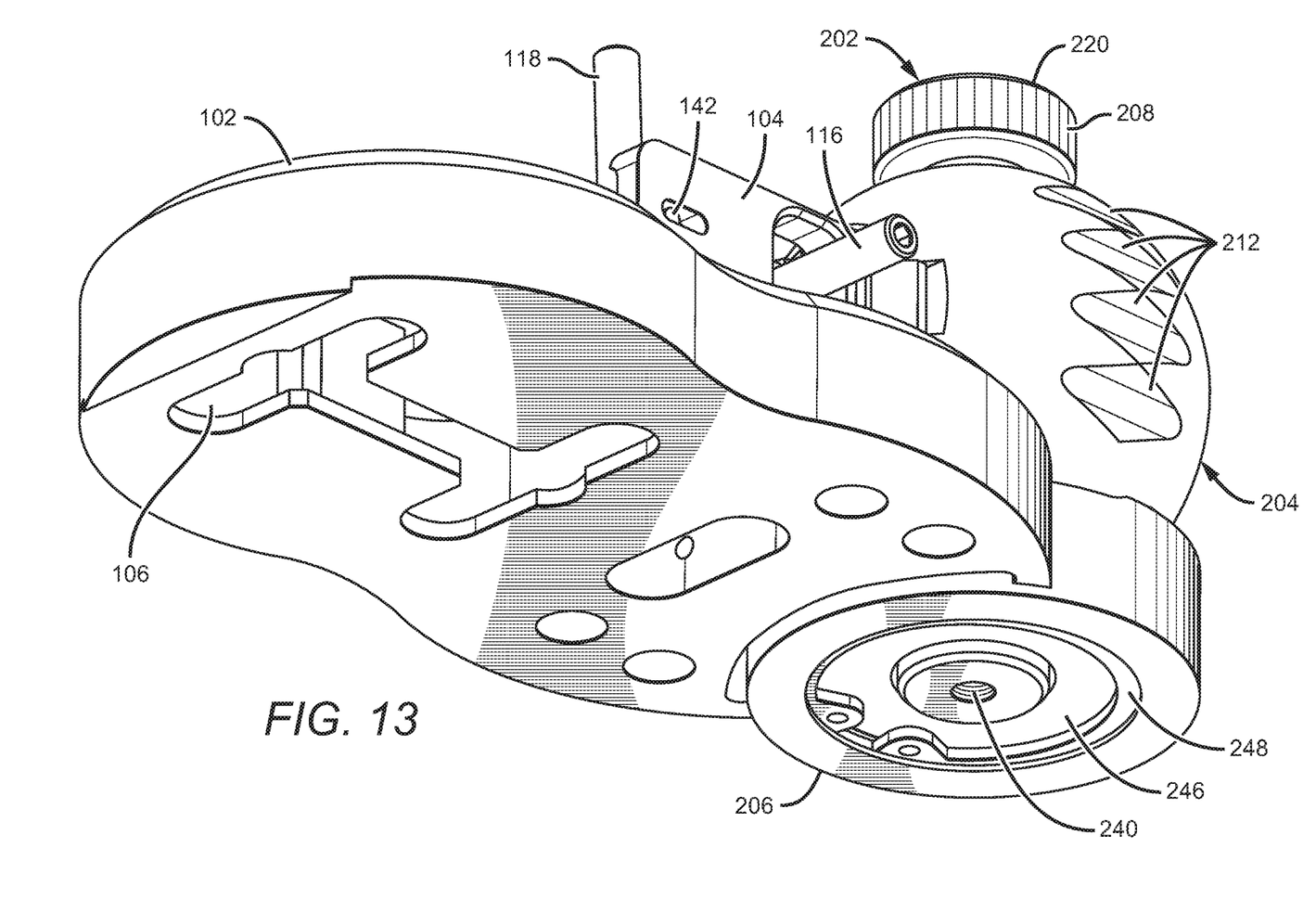
FIG. 13 is a bottom, rear perspective view of an adjustment mechanism with an attached kinematic mount.

In some embodiments, kinematic mirror mounts of the inventive subject matter can include a magnet in the bottom of the footing. For example, FIGS. 9 and 13 show a ring-shaped magnet 246 that fits within a space in the bottom of the footing 206. The ring-shaped magnet 246 is held in place by a magnet retainer 248. The ring-shaped magnet can hold the kinematic mirror mount to, e.g., a prototyping board or any other object or surface made from a material that can be subject to induced magnetization.

Regarding the adjustment mechanism, FIG. 3 shows many internal components that would otherwise be difficult to see. For example, screw harness 120 includes pegs 148 & 150 (visible in FIG. 3) that can allow for limited movement of the screw harness 120 within the control frame 104. As seen in FIG. 3, pegs 148 and 150 fit within slots 152 & 154 and are held in pace by set screws. This configuration allows for replacement or removal of the screw harness 120. It is contemplated that slots for pegs 142 and 144 on screw harness 135 (where peg 144 can be seen in, e.g., FIG. 6) can be cut through to the back end of the control frame, in which case set screws could be used to ensure screw harness 135 remains in place once it is coupled with the control frame 104, similar to the configuration shown for pegs 148 & 150. In some embodiments, instead of, or in addition to, set screws, dowel pins can be used to hold pegs 148 & 150 in place.

As discussed above, control frame 104 and associated components in the adjustment mechanism 100 are designed such that reorienting the control frame 104 in turn reorients the housing 204, where reorientation of the control frame 104 can be accomplished such that the housing 204 moves naturally within the footing 206. In other words, adjustment mechanisms of the inventive subject matter are designed to ensure that the control frame 104 facilitates movement of the housing 204 about a point of rotation that exists at the center of curvature of the curved bottom surface of the housing 204 when it rests within the footing 206.

To minimize accidental movements of the control frame 104, the control frame 104 is held to the main body by a set of springs 134 & 136 that are held in tension. These springs are visible throughout the figures, especially in FIGS. 7 and 11. The first spring 134 couples with both the control frame 104 at a first spring mounting point 140 (e.g., a through hole or hooked portion) and with a first spring screw 138 that is coupled with the main body 102. In some embodiments, the first spring screw 138 can instead be formed with the main body 102 or as part of the mounting frame 128. The first spring 134 thus pulls the control frame 104 toward the first spring screw 138, thereby minimizing accidentally movements of the control frame.

As shown in FIG. 3, the second spring screw 141 is mounted within the main body 102 and provides an anchoring for the second spring 136. As seen best in FIG. 10, the second spring screw 141 can be disposed within any of the three screw slots 146 within the main body 102. Thus, the second spring 136, which is oriented substantially vertically, pulls the control frame 104 toward the second spring screw 141 when the second spring 136 couples with the third spring screw 145 and with the second spring screw 141. Third spring screw 145 can be or include a bar passing through the control frame 104 such that the second spring 136 can hook into the third spring screw 145. Although it is called a "spring screw" in this application, it can be fully threaded, partially threaded, or unthreaded, depending on the needs of an embodiment. In some embodiments, the third spring screw 145 is a dowel or pin dowel. The second spring screw is put into place and otherwise accessed by cutout 143 in the main body 102.

Both the first control screw 116 and the second control screw 118 pass through screw harnesses 120 & 135 having internal threading (e.g., specialized nuts that are held within the control frame 104). In some embodiments, the screw harnesses are formed as part of the control frame 104. The first screw harness 120 is held in place relative to the control frame 104 such that turning the first control screw 116 causes the control frame 104 to move as demonstrated by double-sided arrow 122 shown in FIG. 12 (e.g., rotation about the housing's z-axis). To facilitate movement according to line 122 while the second control screw 118 remains in contact with the main body 102, the main body 102 features an elongated curved divot 124 that a tip of the second control screw 118 rests within. It is contemplated that the first and second control screws 116 & 118 can be the same, each featuring, in some embodiments, a small magnet on one end. For example, FIG. 3 shows second control screw 118 with a magnet 126 on its tip. Magnet 126 helps to hold the second control screw 118 to the main body 102, e.g., such that the magnetic tip of the second control screw 118 remains in contact with the main body 102. In some embodiments, both control screws 116 & 118 can include ball bearings on their tips to make adjustment easier by reducing friction between each control screw and the surfaces their tips contact.

A similar elongated divot exists for the first control screw 116, where that elongated divot 130 is positioned on an upper portion of a mounting frame 128. The upper elongated divot 130 functions to keep the tip of the first control screw 116 within the upper elongated divot 130, thereby facilitating fine adjustment of the position and orientation of the housing 204 while it is coupled with the control frame 104. Thus, both elongated divots work to keep the control screws in contact with their respective components even when the control screws are turned to adjust the position and orientation of the control frame 104 and, accordingly, the housing 204. Although shown to be substantially horizontal, in some embodiments, the elongated divot on the mounting frame 128 can also be oriented substantially vertically, and it can feature a slight curve, while in still further embodiments, instead of an elongated divot, the mounting frame can feature an indented basin with a flat bottom surface. In embodiments where the elongated divot is oriented vertically, control screw harness 120 must be able to rotate within the control frame to allow its tip to remain in the divot when turning control screw 116.

Figure 6:
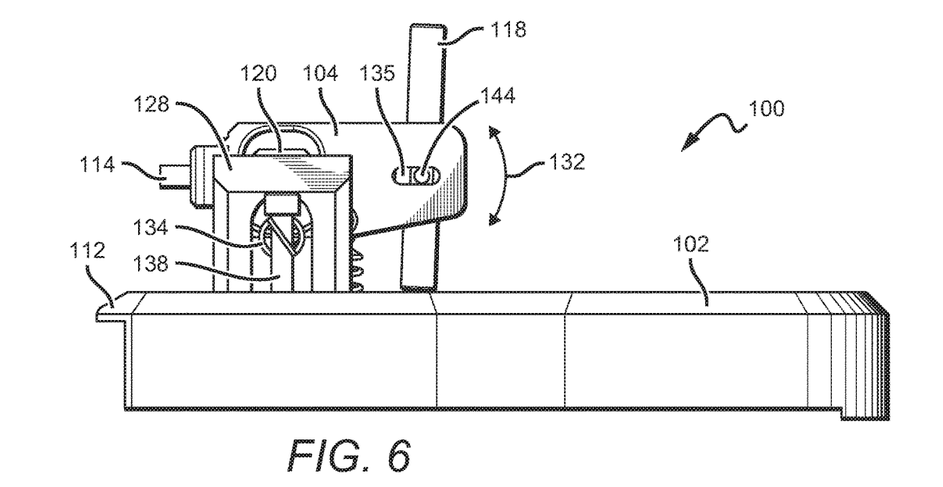
FIG. 6 is a right-side view of an adjustment mechanism.
Figure 7:
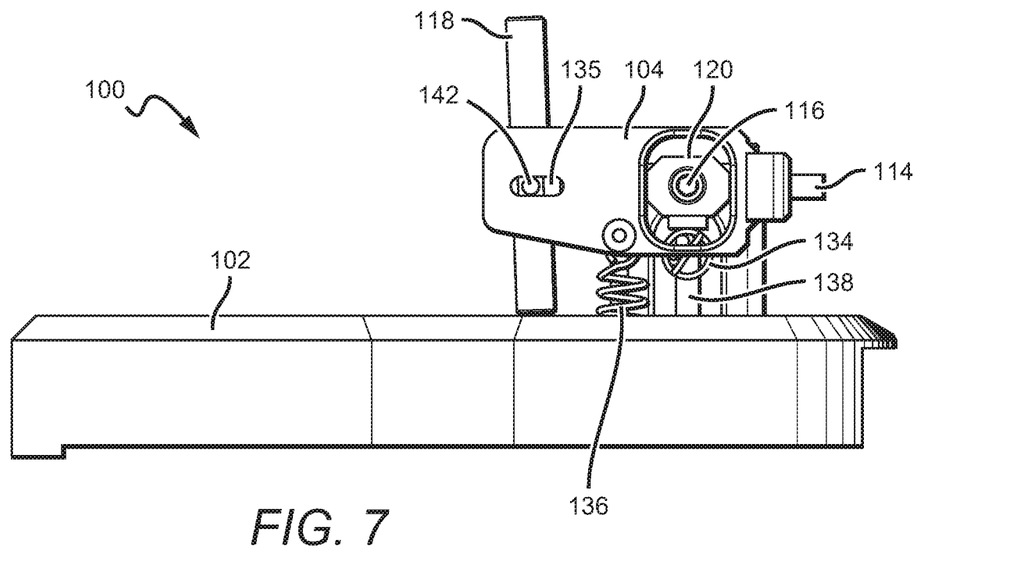
FIG. 7 is a left side view of an adjustment mechanism.

Like the first control screw 116, the second control screw 118 passes through a second screw harness 135. When the second control screw 118 is turned, it interacts with the second screw harness 135 causing movement of the control frame 104. Thus, turning the second control screw 118 causes the control frame to move according to double-sided arrow 132 (e.g., rotation about the housing's x-axis), as shown in FIG. 6. To ensure control frame 104 can move according to movements of the housing 204 that it is coupled with, screw harness 135 includes pegs on either side (peg 142 in FIG. 7 and peg 144 in FIG. 6) that rest within slots (a slot for peg 142 is visible in FIG. 7 and a slot for peg 144 is visible in FIG. 6) in the control frame 104. This allows for the second control screw 118 to tilt as it is turned, facilitating natural movements of the housing 204 while coupled with the control frame 104. In some embodiments, instead of or in addition to set screws, dowel pins can be used to hold pegs 142 & 144 in place.

Figure 11:
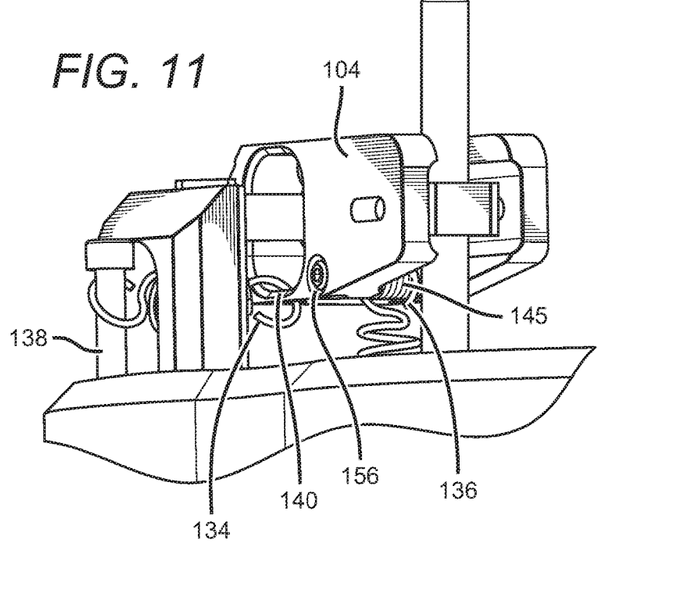
FIG. 11 shows a close-up of a control frame.
Figure 12:
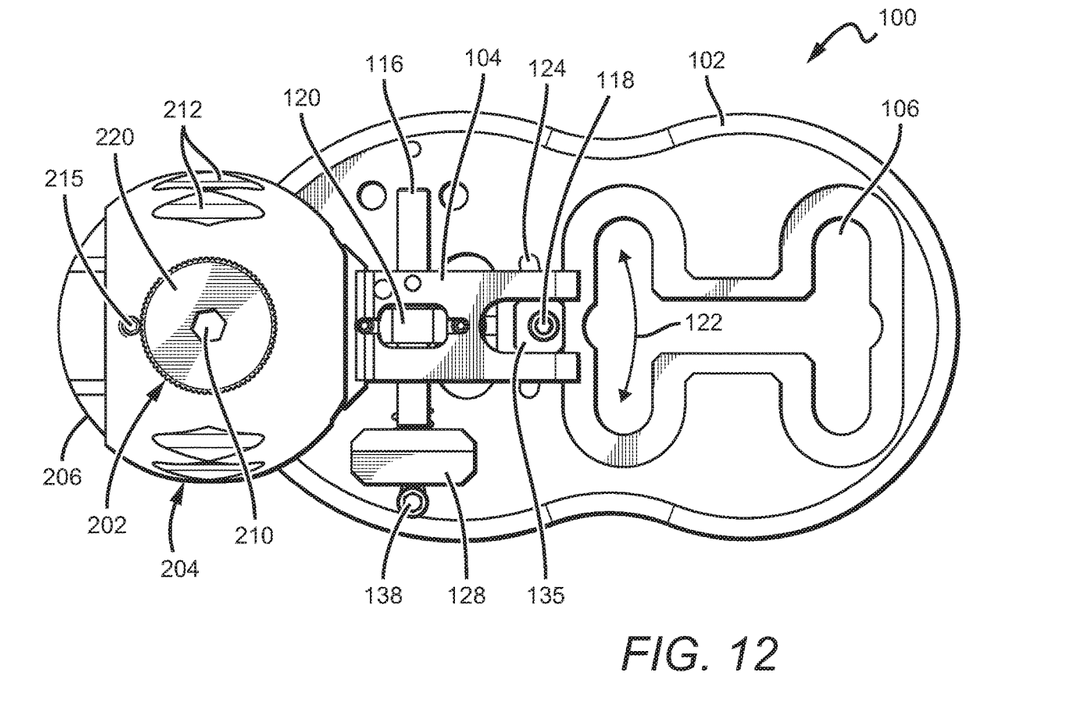
FIG. 12 is a top view of an adjustment mechanism with an attached kinematic mount.

FIG. 11 shows a close-up view of control frame 104, showing how the second spring 136 couples with the control frame 104 by hooking onto a third spring screw 145. In some embodiments, the second spring 136 couples more directly with the control frame 104, such as hooking onto mounting point 156 or onto any other portion of the control frame 104 that can be used to facilitate spring coupling. Mounting point 156 is also an access point for third spring screw 145, and, in some embodiments, includes a small hole near mounting point 156 that creates a place for a hooked end of a spring to couple with.

As mentioned above, a mounting frame 128 is coupled with (or, e.g., formed with) the main body 102. The mounting frame 128 shown in the figures forms an upside-down u-shape. It is formed in this way so that, e.g., the first spring 134 can pass through it, coupling with both the first spring screw 138 and the first spring mounting point 140 located on the control frame 104. Alternative configurations are also contemplated, including a lambda shaped mounting frame, a T-shaped frame, or any frame having space for a vertically oriented elongated divot, a horizontally oriented elongated divot, or even a basin with a flat bottom surface. In some embodiments, the first spring 134 couples with the mounting frame 128 instead of with the first spring screw 138.

Thus, specific kinematic mount and adjustment mechanism systems have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A kinematic mount and associated adjustment mechanism system comprising:
   a main body having a mounting frame;
   a control frame comprising at least one coupling extrusion;
   a first control screw that contacts a main body surface at an end of the first control screw;
   a second control screw oriented orthogonally to the first control screw and that contacts a mounting frame surface at an end of the second control screw;
   wherein the mounting frame surface is orthogonal to the main body surface;
   wherein the first control screw couples with the control frame by passing through a first screw harness that is coupled with the control frame;
   wherein the second control screw couples with the control frame by passing through a second screw harness that is also coupled with the control frame;
   a housing comprising a curved outer surface on at least a bottom portion of the housing, at least one coupling hole on a back side of the housing configured to mate with the at least one extrusion on the control frame, and a housing through hole;
   a footing comprising a cradle that is sized and dimensioned for the curved outer surface of the housing to rest within the cradle, wherein the footing is configured to mate with the main body of the mounting frame;
   a tightening mechanism disposed at least partially within the housing through hole, the tightening mechanism comprising a top portion, a bottom portion, a locking interface component, and a compression spring; and
   wherein the tightening mechanism is configured to hold the housing in place relative to the footing upon tightening the top portion to the bottom portion with the spring and the locking interface component disposed on the top portion such that the locking interface component contacts both the top portion and an interior surface of the housing to apply pressure on the interior surface toward the footing.

2. The system of claim 1, wherein the first and second screw harnesses include internal threading.

3. The system of claim 1, further comprising a first spring and a second spring, wherein the first spring pulls the control frame toward the main body and wherein the second spring pulls the control frame toward a second spring mount that is affixed to the main body.

4. The system of claim 1, wherein the main body comprises an elongated divot for the end of the first control screw to move within upon turning the second control screw, and wherein the mounting frame surface comprises an elongated divot for the end of the second control screw to move within upon turning the first control screw.

5. The system of claim 1, wherein the first screw harness is moveably coupled with the control frame.

6. The system of claim 1, wherein the locking interface component comprises a curved outer surface.

7. The system of claim 1, wherein the top portion comprises a hollow tip with internal threading and the bottom portion comprises a threaded tip configured to screw into the hollow tip.

8. The system of claim 1, wherein the top portion comprises a flared portion between a first end and a second end, the flared portion configured to apply force to the compression spring upon tightening the tightening mechanism.

9. The system of claim 8, wherein the compression spring is configured such that an inner diameter of the spring is greater than the outer diameter of the hollow tip, and wherein the spring is positioned between the flared portion and the locking interface component.

10. The system of claim 1, wherein the locking interface component contacts at least one interior surface of the housing as well as the compression spring.

11. A kinematic mount and associated adjustment mechanism system comprising:

a main body;

a control frame coupled with the main body and comprising at least one coupling extrusion;

a housing comprising a curved outer surface on at least a bottom portion of the housing, at least one coupling hole on a back side of the housing configured to mate with the at least one extrusion on the control frame, and a housing through hole;

a footing comprising a cradle that is sized and dimensioned for the curved outer surface of the housing to rest within the cradle, wherein the footing is configured to mate with the main body;

a tightening mechanism disposed at least partially within the housing through hole, the tightening mechanism comprising a top portion, a bottom portion, a locking interface component, and a compression spring; and wherein the tightening mechanism is configured to hold the housing in place relative to the footing upon tightening the top portion to the bottom portion with the spring and the locking interface component disposed on the top portion such that the locking interface component contacts both the top portion and an interior surface of the housing to apply pressure on the interior surface toward the footing.

12. The system of claim 11, further comprising:
a mounting frame on the main body;
a first control screw that contacts a main body surface at an end of the first control screw;
a second control screw oriented orthogonally to the first control screw and that contacts a mounting frame surface at an end of the second control screw;
wherein the mounting frame surface is orthogonal to the main body surface;
wherein the first control screw couples with the control frame by passing through a first screw harness that is coupled with the control frame; and
wherein the second control screw couples with the control frame by passing through a second screw harness that is also coupled with the control frame.

13. The system of claim 12, wherein the first and second screw harnesses include internal threading.

14. The system of claim 11, further comprising a first spring and a second spring, wherein the first spring pulls the control frame toward the main body and wherein the second spring pulls the control frame toward a second spring mount that is affixed to the main body.

15. The system of claim 11, wherein the main body comprises an elongated divot for the end of the first control screw to move within upon turning the second control screw, and wherein the mounting frame surface comprises an elongated divot for the end of the second control screw to move within upon turning the first control screw.

16. The system of claim 11, wherein the first screw harness is moveably coupled with the control frame.

17. The system of claim 11, wherein the locking interface component comprises a curved outer surface.

18. The system of claim 11, wherein the top portion comprises a hollow tip with internal threading and the bottom portion comprises a threaded tip configured to screw into the hollow tip.

19. The system of claim 11, wherein the top portion comprises a flared portion between a first end and a second end, the flared portion configured to apply force to the compression spring upon tightening the tightening mechanism.

20. The system of claim 11, wherein the locking interface component contacts at least one interior surface of the housing as well as the compression spring.

* * * * *